March 19, 1968  O. HERMANN  3,373,641
CHUCK CONSTRUCTION
Filed April 22, 1965  3 Sheets-Sheet 1

INVENTOR
OTTO HERMANN
BY
Wood, Herron & Evans.
ATTORNEYS

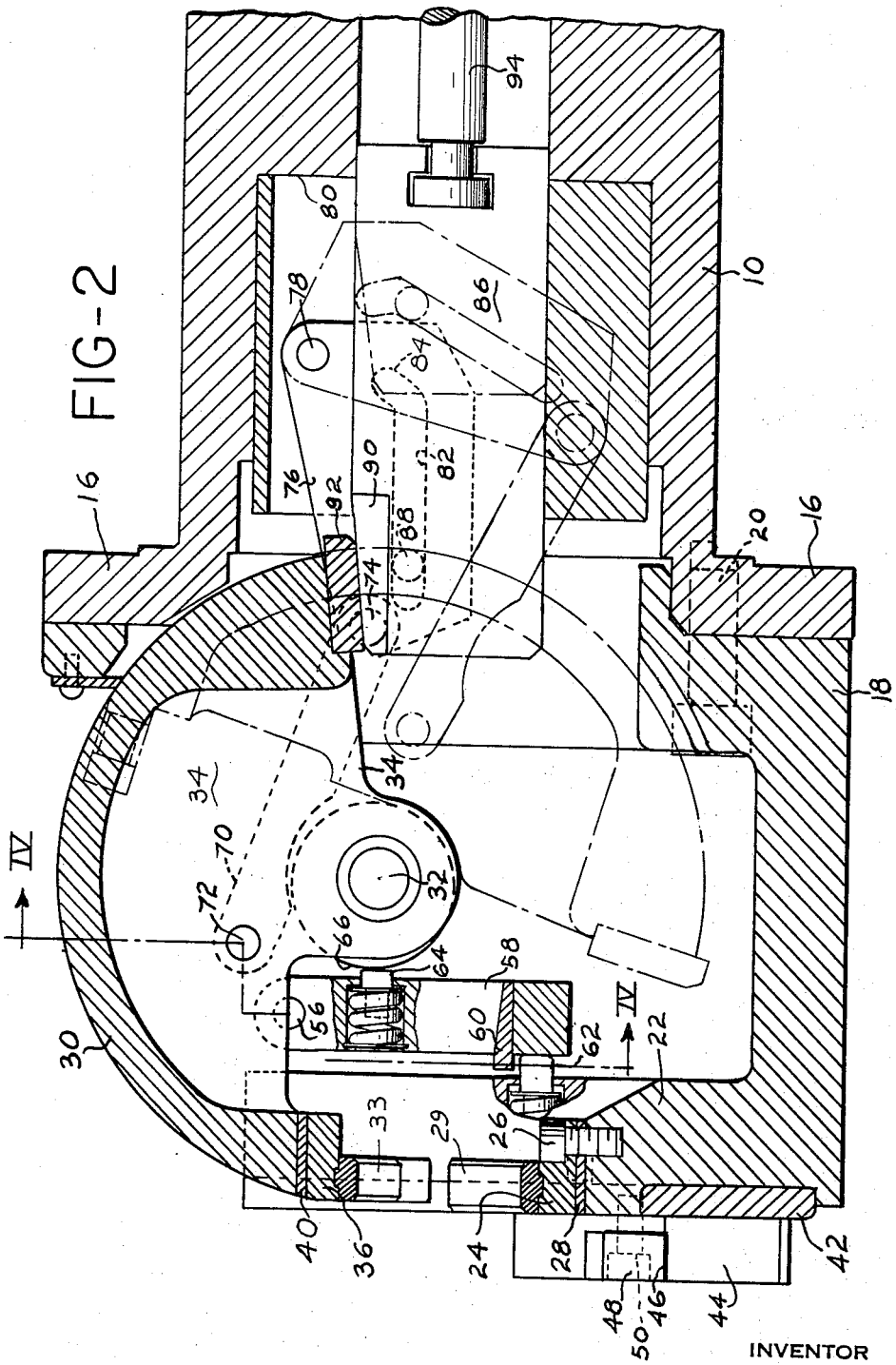

March 19, 1968     O. HERMANN     3,373,641
CHUCK CONSTRUCTION
Filed April 22, 1965     3 Sheets-Sheet 3
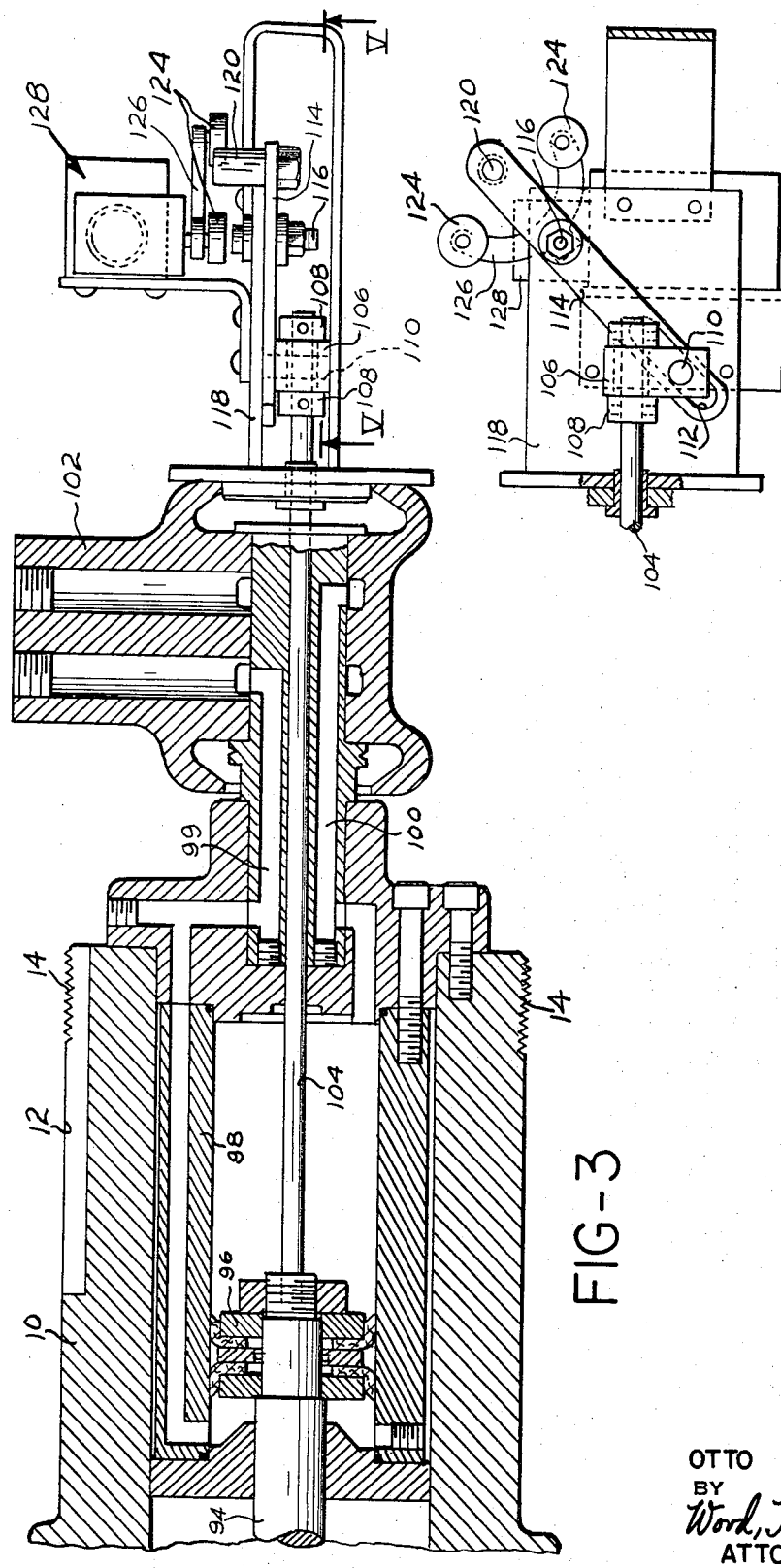
INVENTOR
OTTO HERMANN
BY
Word, Herron & Evans.
ATTORNEYS United States Patent Office 3,373,641
Patented Mar. 19, 1968

3,373,641
CHUCK CONSTRUCTION
Otto Hermann, Cincinnati, Ohio, assignor to The R. K. Le Blond Machine Tool Co., Cincinnati, Ohio, a corporation of Delaware
Filed Apr. 22, 1965, Ser. No. 449,991
12 Claims. (Cl. 82—40)

ABSTRACT OF THE DISCLOSURE

A chuck for holding the end of a crankshaft while the pin portions of the crankshaft are machined. The chuck includes a stationary jaw and a pivoted jaw. The pivoted jaw is operated by an arm which is connected through a lost motion linkage to a slidable block. The slidable block, which is connected to a reciprocating fluid motor, also carries a wedge for locking the pivoted jaw closed. The stationary jaw carries adjustable drive members for engagement with the chuck.

---

This invention relates to a chuck for holding workpieces during machining and is particularly concerned with a chuck which is readily adaptable to workpieces of different sizes. More particularly still, the present invention is concerned with a novel chuck for holding a crankshaft during the machining thereof, especially during the machining of the crank pin regions thereof.

Chucks for holding crankshafts during the machining of the pin portions thereof are known and usually comprise pot type chucks that receive the end portions of the crankshaft and clamp the crankshafts in place, thus exposing the pin bearing portions for a turning operation. In most instances, in addition to chucks engaging the end portions of the crankshafts, a steady rest structure is employed supportingly engaging an intermediate line bearing portion of the crankshaft to support the crankshaft against deflection due to the heavy cutting loads while simultaneously holding the crankshaft in a predetermined axial position.

The present invention is particularly concerned with a chuck structure for engaging the end portion of the crankshaft in a lathe and which chuck is so constructed as to be readily adaptable to crankshafts of different sizes, and including adjustable means to adapt the chuck to the exact conditions to which the crankshaft is brought to the chuck.

With the foregoing in mind, it will be evident that the primary object of the present invention is the provision of an improved chuck for a machine tool.

Another object of this invention is the provision of a chuck having a substantial degree of universality in that it can readily be adjusted to workpieces of different size.

Still another object of this invention is the provision of a chuck for clamping workpieces on the work axis of a lathe which is simple to actuate between open and closed positions.

Still another object of this invention is the provision of a novel interlock switch actuating mechanism associated with the chuck so that the open and closed positions of the chuck can be detected for controlling work operations relating thereto.

Still another object of this invention is the provision of a chuck especially adapted for clamping the ends of crankshafts during the machining of the pin bearing portions thereof which is relatively compact.

One of the principal advantages of the present chuck construction, in addition to its universality, is its efficiency. More particularly, the present chuck has a substantially greater holding power as compared to chucks of the prior art. By way of comparison, the present chuck develops the same holding power when actuated by a two hundred and fifty pound force as a previous chuck developed when operated by an eight hundred pound force.

Another important advantage of the present chuck is that it is effective to hold the crankshaft more rigidly, thereby facilitating more accurate machining of the various crankshaft surfaces.

Another important advantage of the present chuck construction is that it is more fail safe against accidental opening since the chuck operating mechanism is self-locking.

A still further advantage of the present chuck construction is that it provides for both positive opening and closing of the jaws. Thus, the jaws are opened and closed in a completely reliable fashion during each operating cycle. This eliminates malfunctions of the type previously encountered with spring opening jaws which tended to stick on occasion because of accumulation of chips and dirt.

These and other objects and advantages of this invention will become more apparent upon reference to the following specification taken in connection with the accompanying drawings, in which:

FIGURE 1 is a front elevational view of a chuck constructed according to the present invention.

FIGURE 2 is a vertical longitudinal section through the chuck indicated by line II—II on FIGURE 1.

FIGURE 3 is a sectional view forming a continuation of FIGURE 2 toward the right end thereof.

FIGURE 4 is a fragmentary sectional view taken substantially on line IV—IV of FIGURE 2, and FIGURE 5 is a sectional view indicated by line V—V on FIGURE 3 showing details in connection with the interlock switch arrangement.

Referring to the drawings somewhat more in detail, and with particular reference to FIGURES 1, 2, 3 and 4, the chuck according to the present invention is constructed with a hollow shaft portion 10 which is adapted for being journalled in the frame of the lathe in which the chuck is mounted for rotation of the chuck about the longitudinal axis of the shaft 10. The shaft 10, as will be seen in FIGURE 3, may have a key way 12 in the end portion thereof and a threaded region 14 so that a drive gear can be mounted on the shaft for driving the chuck in rotation.

The shaft 10 toward the chuck body is formed with a flange means 16 to which the frame or body 18 of the chuck is secured as by cap screws 20.

The body or frame of the chuck is of box-like configuration and has an upstanding front wall 22 which supports lower jaw element 24. Jaw element 24 is held in place on front wall 22 of the chuck body by cap screws 26 and is located precisely in the chuck body by spacer or shim elements 28. Reference to FIGURE 1 will show that the upstanding front wall 22 of the chuck body has a substantially U-shaped opening therein in which lower jaw 24 is mounted. This jaw carries a half bushing 29 which is held in place by bolts 31.

Within the U-shaped opening there is movable the curved clamp arm 30 which is pivoted to the chuck body as by the pivot means 32. These pivot means extend through the side walls of the chuck body and into bearing portions formed on the dependent side walls 34 of clamping arm 30. Clamping arm 30 at its front end supports an upper jaw 36 which is fixed thereon as by bolts 38 and located accurately with respect to the clamp arm by the spacer or shim means 40. Jaw 36 carries a half bushing 33 which is held in place by bolts 35.

As will best be seen in FIGURES 1 and 2, the front end of the chuck body, namely, the upstanding front wall 22 is provided with an arcuate recess in which a drive plate 42 is mounted. Drive plate 42 has two axially forwardly extending raised portions 44 thereon on opposite sides of the vertical center line of the chuck, and these portions are slotted as at 46 for receiving drive members 48. The drive members 48 are clamped in the recesses by cap screws 50 and the drive members 48 are slotted as at 52 to permit adjustment thereof toward and away from the vertical center line of the chuck body. Spacer or shim means 54 may be provided for backing up the drive members so that they will not slip.

When a crankshaft is inserted into the chuck, a web portion thereof depends into the spacer between drive members 48 and premachined flats on the web fit closely against the drive members and torque is thereby transmitted from the chuck into the crankshaft. A cylindrical portion of the crankshaft is received between jaws 24 and 36 and is tightly clamped therein.

Swingably suspended in the chuck body as by the shaft means 56 is an upwardly opening U-shaped yoke 58. On its bottom portion this yoke carries a block 60 which is adapted for abutting a shoulder on the crankshaft inserted in the chuck. A first spring pressed plunger 62 in the chuck body urges the yoke inwardly of the chuck body while a second spring pressed plunger 64 carried by the yoke is adapted for urging the yoke outwardly in the chuck body when acted upon by a cam or eccentric portion 66 carried by clamp arm 30. When clamp arm 30 is retracted, plunger 64 is released, and when clamp arm 30 is moved to its clamping position, cam 66 engages plunger 64 and urges the yoke in a direction outwardly of the chuck. The referred to yoke can thus assist in effecting accurate axial location of the crankshaft prior to the machining operation on the crankshaft.

Opening and closing of the chuck is accomplished by pivoting clamp arm 30 about its pivotal support means 32. This is accomplished by an arm 70 pivoted at one end at 72 to clamp arm 30 and pivoted at its other end at 74 to a plate 76. Plate 76, in turn, is pivoted at 78 to a block member 80 fixedly in a hollow shaft 10. The plate 76 is formed with a slot 82 extending longitudinally of the lathe and terminating in end portion 84 extending upwardly and angularly in the main portion of the slot.

Reciprocably mounted in block 80 is a clamping wedge block 86. This wedge carries a pin 88 that engages the slot 82, 84 in plate 76. When wedge member 86 is moved rightwardly, pin 88 will engage the angular portion 84 of the slot and will cause plate 76 to rotate to the dot-dash position of FIGURE 2, which will pull arm 70 into its dot-dash position, which will, in turn, cause clamp arm 30 to move to its dot-dash position thus opening the chuck. It will be apparent at this point that, with the chuck open, the crankshaft can be lifted vertically from the chuck and taken therefrom and a new crankshaft can be inserted in the vertical direction.

Wedge member 86 has a tapered portion at the left end at the top as viewed in FIGURE 2 which has a hardened insert 90. This hardened insert is adapted for engaging the hardened member 92 fixed to the back end of clamp arm 30. It will be evident that leftward movement of wedge member 86 from its retracted position will fix swinging clamp arm 30 into about its clamping position and the final movement of wedge 86 will tightly wedge the clamp arm in clamping position.

Reciprocation of wedge member 86 is accomplished by plunger 94 which has mounted thereon a double-acting piston 96, as will be seen in FIGURE 3. Piston 96 is reciprocated in cylinder 98 mounted in the end of shaft 10. Fluid is supplied to opposite sides of piston 96 via passage means 99 and 100 which lead to corresponding passage means in a rotary connecting member 102 to which is connected hoses or conduits leading to a control valve.

Also connected with plunger 94 is a rod 104 that extends out the end of the assembly and operates a position detecting switch means. At the extreme end of rod 104 there is connected thereto a block 106 as by being retained between collars 108 pinned on shaft 104. Block 106 laterally of rod 104 carries a pin 110 which engages a slot 112 in a lever 114 which is pivoted by bolt means 116 to a stationary plate 118 forming a part of the framework of the detector assembly. Lever 114 on its extreme outer end carries an upstanding pin 120. Pin 120 is movable in the space between a pair of rollers 124 that are carried on a switch actuating arm 126, which is pivotally connected to the switch means 128 which it controls on an axis which is co-axial with pivot bolt 116. The arrangement is such that when piston 96 is in one end position showing that the chuck is closed, the switch is actuated into one position, whereas when the piston is in its other end position showing that the chuck is open, the switch is actuated into its other position. The switch can thus be employed for insuring that machining operations are initiated, only when the chuck is closed and that loading and unloading operations are carried out only when the chuck is open.

Because of the replaceable and adjustable jaws and because of the adjustable drive elements, the chuck structure has substantially universal application, and because of the arcuate swinging clamp arm the chuck structure is relatively compact and operates rapidly and without the use of expensive screws and worms, which have heretofore been employed in chucks of this general nature.

Furthermore, the swingable clamp arm permits the use of an actuating piston and cylinder means axially spaced from the chuck, thus permitting inexpensive construction and also making it a simple matter to supply actuating fluid to the piston and cylinder and a simple matter to detect the open and closed positions of the chuck.

It will be understood that this invention is susceptible to modification in order to adapt it to different usages and conditions; and accordingly, it is desired to comprehend such modifications within this invention as may fall within the scope of the appended claims.

Having described my invention, I claim:

1. In a chuck; a body, shaft means on one end of the body supporting the body and defining an axis of rotation for the body, a first jaw element fixed in the other end of the body for supporting one end of a workpiece on a work axis coinciding with said axis of rotation, a second jaw element movably mounted in said body for movement into opposed relation to said first jaw element to clamp said one end of a workpiece between the jaw elements, an arm pivoted in said body on a second axis extending at right angles to said axis of rotation of the body and spaced from said first jaw element, means fixing said second jaw element to one end of said arm, a block reciprocably mounted in said body on the opposite side of said second axis from said first jaw element, a link, means pivotally connecting one end of said link with said arm, lost motion means connecting the other end of said link to said block, whereby reciprocation of said block will pivot said arm, and cooperating wedge means on the end of said arm opposite said second jaw element and on the end of said block nearest said arm operable for wedging said arm in clamping position.

2. The chuck construction of claim 1 further comprising means for shifting said block, said means including reciprocating motor means carried by said body on the opposite side of said block from said second axis and connected to said block, means for reversibly supplying actuating fluid to said motor means, a switch supported externally of said body, and means for actuating said switch including a rod connected to said motor means.

3. The chuck construction of claim 1 further comprising means for shifting said block, said last named means including reciprocating motor means carried by said body on the opposite side of said block from said second axis and connected to said block, means for reversibly supplying actuating fluid to said motor means, a switch supported externally of said body, and means for actuating said switch including a rod connected to said motor means, said switch being a snap action switch and being operated into a different one of its operative positions in each extreme position of said block.

4. The chuck construction of claim 1 further comprising a member in the body adapted for engaging an end region of a workpiece on said work axis, and spring means for biasing said member in a direction toward the workpiece and operable upon movement of said arm to carry said second jaw element toward said first jaw element.

5. The chuck construction of claim 1 further comprising drive members projecting from the face of said body for driving engagement with a workpiece clamped between said jaw elements.

6. The chuck construction of claim 1 further comprising a drive plate mounted on said one end of said chuck, and drive lugs on said plate for driving engagement with a workpiece having an end clamped between said jaw elements.

7. The chuck construction of claim 1 further comprising a drive plate mounted on said one end of said chuck, and drive lugs on said plate for driving engagement with a workpiece having an end clamped between said jaw elements, said drive lugs being adjustably mounted on said drive plate for accommodating workpieces of different dimensions.

8. The chuck construction of claim 1 further comprising a drive plate mounted on said one end of said chuck, and drive lugs on said plate for driving engagement with a workpiece having an end clamped between said jaw elements, said drive lugs being adjustably mounted on said drive plate for accommodating workpieces of different dimensions, and said jaw elements being adjustably detachably connected to their respective supporting members.

9. In a chuck; a body, means on one end of the body forming shaft means for supporting the body on a predetermined axis of rotation, a first jaw element fixed in the body at the other end for supporting engagement with one end of a workpiece on a work axis extending away from said body and coinciding with said axis of rotation, a second jaw element for movement into opposed relation to said first jaw element to clamp said one end of a workpiece between said jaw elements, a curved arm pivoted in said body on a second axis extending at right angles to said axis of rotation and spaced from said first jaw element on the side thereof opposite said work axis, means fixing said second jaw element to one end of said arm, a block reciprocably guided in said body for movement substantially parallel to said axis of rotation and located on the opposite side of said second axis from said first jaw element, means operatively connecting said block with said arm so that movement of said block toward said second axis will move said arm in the clamping direction to bring said second jaw element into clamping position with respect to said first jaw element while movement of said block in the other direction will cause movement of said arm to retract said second jaw element from said first jaw element, and cooperating elements of a wedge means on the other end of said arm and on the end of said block nearest said arm operable for wedging inter-engagement when said arm is in clamping position, said means operatively interconnecting said arm with said block comprising lost motion means operable to effect movement of said arm into clamping position during the initial portion of the movement of said block toward said second axis while permitting further movement of said block to make said wedging means effective after the arm is in clamping position.

10. In a chuck; a body, means on one end of the body forming shaft means for supporting the body on a predetermined axis of rotation, a first jaw element fixed in the body at the other end for supporting engagement with one end of a workpiece on a work axis extending away from said body and coinciding with said axis of rotation, a second jaw element for movement into opposed relation to said first jaw element to clamp said one end of a workpiece between said jaw elements, a curved arm pivoted in said body on a second axis extending at right angles to said axis of rotation and spaced from said first jaw element on the side thereof opposite said work axis, means fixing said second jaw element to one end of said arm, a block reciprocably guided in said body for movement substantially parallel to said axis of rotation and located on the opposite side of said second axis from said first jaw element, means operatively connecting said block with said arm so that movement of said block toward said second axis will move said arm in the clamping direction to bring said second jaw element into clamping position with respect to said first jaw element while movement of said block in the other direction will cause movement of said arm to retract said second jaw element from said first jaw element, and cooperating elements of a wedge means on the other end of said arm and on the end of said block nearest said arm operable for wedging inter-engagement when said arm is in clamping position, said means operatively inter-connecting said arm and said block comprising a plate pivoted in the body, a link connected at one end to said arm and at the other end to said plate, said pin and slot means inter-connecting plate and block and forming a lost motion connection between the plate and block.

11. In a chuck; a body, means on one end of the body forming shaft means for supporting the body on a predetermined axis of rotation, a first jaw element fixed in the body at the other end for supporting engagement with one end of a workpiece on a work axis extending away from said body and coinciding with said axis of rotation, a second jaw element for movement into opposed relation to said first jaw element to clamp said one end of a workpiece between said jaw elements, a curved arm pivoted in said body on a second axis extending at right angles to said axis of rotation and spaced from said first jaw element on the side thereof opposite said work axis, means fixing said second jaw element to one end of said arm, a block reciprocably guided in said body for movement substantially parallel to said axis of rotation and located on the opposite side of said second axis from said first jaw element, means operatively connecting said block with said arm so that movement of said block toward said second axis will move said arm in the clamping direction to bring said second jaw element into clamping relationship with said first jaw element while movement of said block in the other direction will cause movement of said arm to retract said second jaw element from said first jaw element, and cooperating elements of a wedge means on the other end of said arm and on the end of said block nearest said arm operable for wedging inter-engagement when said arm is in clamping position, said means operatively inter-connecting said arm and said block comprising a plate pivoted in the body, a link connected at one end to said arm and at the other end to said plate, a slot in said plate which extends substantially parallel to the direction of movement of said block when said plate is moved into position to move said arm into clamping position and a pin in the block extending into the slot, said slot having an angular terminal portion at the end toward which the pin moves when the block is being retracted from said arm.

12. In a chuck; a body having means at one end for supporting the body for rotation on a first axis, a first jaw element in the body at the opposite end for engaging one end of a workpiece on a work axis which is co-axial with said first axis, a second jaw element, a curved arm pivoted in the body on a second axis transverse to said first axis and spaced from said first jaw element on the side thereof opposite said work axis, said arm being concave toward said second axis and having said second jaw element fixed to one end thereof, said arm being movable from a first clamping position wherein said second jaw element is in opposed relation to said first jaw element to a second position wherein said second jaw element is retracted from said first jaw element, a block slidable in said body, means operatively connecting said body to said arm, said body being movable toward said second axis to an advanced position wherein said arm is in its first position and being movable away from said second axis to a retracted position wherein said arm is in its second position, the end of said block nearest said second axis wedgingly engaging the other end of said arm when the block is in its advanced position and being spaced from the path of the arm when the block is in its retracted position, said means operatively inter-connecting said arm with said block comprising lost motion means operable to effect movement of said arm into its first clamping position during the initial portion of the movement of said block toward said second axis while permitting further movement of said block to make said wedging means effective after the arm is in its first clamping position.

References Cited

UNITED STATES PATENTS

| | | | |
|---|---|---|---|
| 1,934,975 | 11/1933 | Groene | 82—40.1 |
| 2,067,107 | 1/1937 | Tomkins | 82—40.1 |

LEONIDAS VLACHOS, *Primary Examiner.*